United States Patent [19]
Broekstra et al.

[11] 3,914,647
[45] Oct. 21, 1975

[54] LIGHT SENSOR FOR USE WITH ELECTRONIC FLASH UNITS

[75] Inventors: Bert Broekstra, Denver; Dennis J. Wilwerding, Littleton, both of Colo.

[73] Assignee: Honeywell Inc., Minneapolis, Minn.

[22] Filed: Mar. 29, 1974

[21] Appl. No.: 456,290

[52] U.S. Cl............. 315/241 P; 315/151; 315/159
[51] Int. Cl.²......................................... H05B 37/00
[58] Field of Search................. 315/241 P, 151, 159

[56] References Cited
UNITED STATES PATENTS

| | | | |
|---|---|---|---|
| 3,675,074 | 7/1972 | Dennewitz | 315/241 P X |
| 3,714,443 | 1/1973 | Ogawa | 315/241 P X |
| 3,793,556 | 2/1974 | Wilwerding | 315/241 P X |

Primary Examiner—James B. Mullins
Attorney, Agent, or Firm—Arthur H. Swanson; Lockwood D. Burton; George E. Bodenstein

[57] ABSTRACT

A light control system includes a first switching device, a light sensing device, and a flash device. The switching device is a selectively operable for providing a contact closure to effect the production of light from the flash device for the illumination of a scene to be photographed. A quench signal to effect the termination of the light provided by the flash device is generated by the light sensing device when sufficient light is received from the scene. The light sensing device includes circuitry which substantially precludes the generation of a false quench signal which might otherwise appear to terminate the production of light by the flash device prematurely.

4 Claims, 2 Drawing Figures

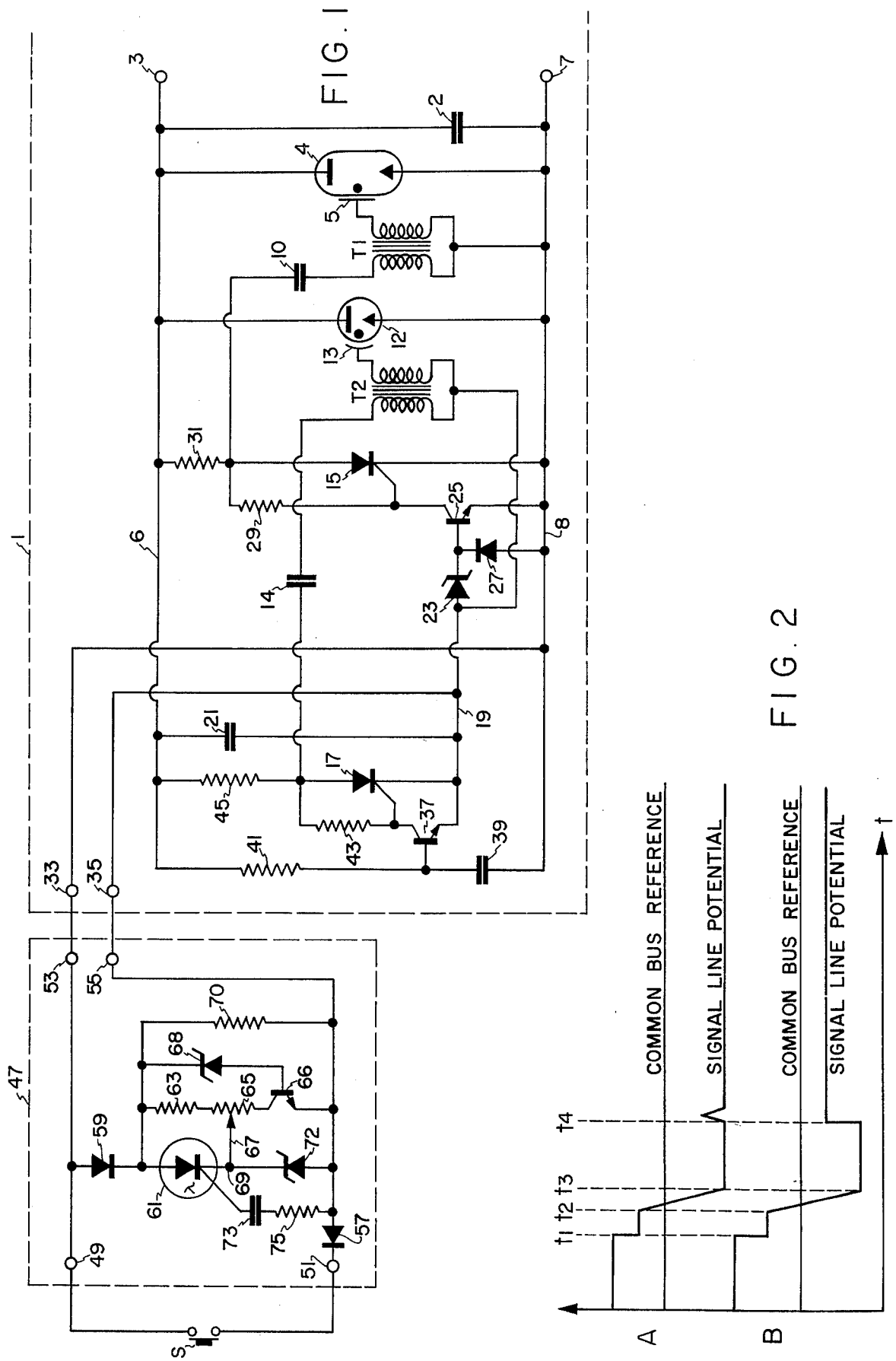

3,914,647

LIGHT SENSOR FOR USE WITH ELECTRONIC FLASH UNITS

BACKGROUND OF THE INVENTION

The present invention relates generally to computer-type photoflash circuits, and more specifically to an improved light sensing device for use therein such as may be found, for example, in U.S. Patent Office classification Class 315, Sub class 159.

Electronic photographic flash systems are known in the art in which the flash of light produced by the flash unit of the system is automatically terminated by light responsive sensing means after a predetermined total quantity of light has been received from the scene being photographed. Such a system is disclosed in U.S. Pat. No. 3,793,556. While such sensing means have been generally satisfactory, there has still existed a need for an improved sensing means wherein the termination of the light provided by the flash unit is effected even more accurately and more reiably, even under varying conditions, than has been realized through the use of prior art devices.

Specifically, there has been a possibility in some prior art sensing means to generate a false light terminating or quench signal before the sensing means has actually received the programmed predetermined amount of light from the object being photographed. In the past, the sensing means of a computer-type flash system passes a flash signal from an associated camera to the flash unit to initiate the production of light for the illumination of the scene being photographed. When the flash unit is fired, an enable signal is then sent from the flash unit to the sensing means to enable the sensing means to begin integrating the light received from the scene. Subsequently, after receipt of a predetermined amount of light from the scene, the sensing means generates a quench signal which is effectively communicated to the flash unit to terminate the production of light by the flash device. In prior art devices, there has existed a possibility that a false quench signal would be generated in response to the receipt by the light sensing means of the enable signal rather than in a response to the receipt of a predetermined amount of light.

Furthermore, the quench signal which was generated in prior art devices appeared in the form of a relatively short pulse of energy. In some instances, that pulse may become lost among noise signals and may not be discearnable. Moreover, when several flash units are being operated by one sensing device, that single pulse of energy may not be sufficient to effect the termination of the several flash units being used. Therefore, there exists a need for an improved sensing means which provides a distinct and readily identifiable quench signal of sufficient energy to effect a quenching of a plurality of flash units.

SUMMARY OF THE INVENTION

It is, accordingly, an object of the present invention to provide an improved light sensing means which fulfills the foregoing needs.

It is a further object of the present invention to provide improved light sensing means which is substantially precluded from generating a quench signal prior to a receipt of a predetermined amount of light from the scene being photographed.

It is another object of the present invention to provide an improved light sensing means as set forth which further generates a readily identifiable quench signal of sufficient energy to effect a quenching of a plurality of flash units.

In accomplishing these and other objects, there has been provided in accordance with the present invention, an improved light sensing means for use in a computer type photo flash circuit. The light sensing means includes means for rendering the sensing means incapable of generating a quench signal until after a sensing means has received a predetermined amount of light from the scene being photographed.

BRIEF DESCRIPTION OF THE DRAWINGS

A better understanding of the present invention may be had from the following detailed description when read in connection with the accompanying drawings in which:

FIG. 1 is a schematic diagram of a computer-flash system including a sensing means in accordance with one embodiment of the present invention; and FIG. 2 is a chart helpful in illustrating the operation of the present invention.

DESCRIPTION OF THE PREFERRED EMBODIMENT

Referring in more detail to FIG. 1, there is shown a light producing or flash unit 1 including a capacitor 2 connected between two terminates 3 and 7. The two terminals 3 and 7 are connected to the usual capacitor charging means which are not shown in FIG. 1. Such capacitor charging means are well known in the art and it is sufficient to say that the capacitor 2 is normally maintained in the charged state by the aforementioned capacitor charging means whereby a relatively high voltage is maintained across the capacitor 2. The high voltage terminal 3 is connected to a high voltage bus 6 while the reference terminal 7 is connected to a reference bus 8. A flash or light producing tube 4 is shown with its anode connected to the bus 6 and its cathode connected to the bus 8. A light triggering electrode 5 of the flash tube 4 is coupled through a transformer T1 to one terminal of a capacitor 10. The other terminal of the capacitor 10 is connected to the anode terminal of a silicon controlled rectifier (SCR) 15. The common terminal of the transformer T1 is connected to the bus 8. A light terminating or quench tube 12 is shown connected between the bus 6 and the bus 8. A triggering terminal 13 of the quench tube 12 is connected through a transformer T2 to one terminal of a capacitor 14. The other terminal of the capacitor 14 is connected to the anode terminal of a second SCR 17. The common terminal of the transformer T2 is connected to a signal line bus 19. A capacitor 21 connects the high voltage bus 6 with the signal line bus 19. The signal line bus 19 is further connected to the anode of a zener diode 23. The cathode of the zener diode 23 is connected to a common point between the base electrode of an NPN transistor 25 and the cathode electrode of a diode 27. The anode electrode of the diode 27 is connected to the common or reference bus 8. The collector electrode of the transistor 25 is connected through a resistor 29 to the anode electrode of the SCR 15. The high voltage bus 6 is connected to the anode electrode of the SCR 15 through a resistor 31. The gate electrode of the SCR 15 is connected to the collector electrode of the transistor 25, while the cathode electrode of the SCR 15 is connected to the common bus 8. The emitter electrode of the transistor 25 is also connected to the common bus 8. An input terminal 33 of the flash device 1 is connected to the common bus 8 and the other input terminal 35 of the flash device 1 is connected to the signal line bus 19. The signal line bus 19 is connected to the emitter electrode of an NPN transistor 37. The base electrode of the transistor 37 is connected through a capacitor 39 to the common bus 8. The base electrode of the transistor 37 is also connected through a resistor 41 to the high voltage bus 6. The collector electrode of the transistor 37 is connected through two resistors 43 and 45 to the high voltage bus 6. The common point between the two resistors 43 and 45 is connected to the anode electrode of the SCR 17. The gate electrode of the SCR 17 is connected to the collector electrode of the transistor 37, the cathode electrode of the SCR 17 being connected to the signal line bus 19.

A sensing means 47 has a first pair of terminals 49 and 51. The input terminal 49 is connected directly to one terminal 53 of a second pair of terminals 53 and 55. The other input terminal 51 is connected through the cathode to anode path of a diode 57 to the other terminal 55 of the second pair of terminals. The input terminals 49 and 51 may for example be connected externally to a shutter switch S of an associated camera. The input terminal 49 is connected through the anode to cathode path of a diode 59 to the anode electrode of a light activated silicon controlled rectifier (LASCR) 61. The anode of the LASCR 61 is also connected through two series connected resistors 63 and 65 to the collector of the transistor 66. The emitter of the transistor 66 is connected to the terminal 55, the base electrode thereof being connected through the anode to cathode path of a zener diode 68 to the anode of the LASCR 61. The cathode of the zener diode 68 is also connected to the terminal 55 through a resistor 70. The resistor 65 has a slider 67 which is connected to the cathode of the LASCR 61 at a common point 69. The common point 69 is connected through the cathode to anode path of a zener diode 72 to the terminal 55. The gate electrode of the LASCR 61 is connected to one terminal of a capacitor 73. The other terminal of the capacitor 73 is connected through a resistor 75 to the terminal 55. The second pair of terminals 53 and 55 of the sensing means 47 are connected to input terminals 33 and 35, respectively, of the flash unit 1.

In operation, the capacitor 10 of the flash unit 1 is charged from the high voltage bus 6 through the resistor 31. The capacitor 14 of the flash unit 1 is similarly charged from the high voltage bus 6 through the resistor 45. The transistor 37 is so biased that it is normally conducting, in a steady state condition. The transistor 25 is also so biased that it is normally conducting. With the transistor 37 conducting, the gate of the SCR 17 is effectively clamped to its cathode and the SCR 17 is therefore non-conductive. Similarly, with the transistor 25 conducting, the gate of the SCR 15 is effectively clamped to its cathode, thereby precluding conduction. When a switching means, for example the shutter switch S of an associated camera, provides a contact closure between the input terminals 49 and 51 of the light sensing means 47, a current flows from the bus 19 in the flash unit 1 through the diode 57 in the sensing means 47 to the flash unit reference bus 8. At that time, the LASCR 61 will remain disabled since the diode 59 is reverse biased. The voltage on the signal line bus 19 decreases since a lower resistance path (diode 57) is now present between the signal line bus 19 and the common bus 8 than was present before the switch S closure (zener diode 23 and the base to emitter path of the transistor 25).

The lower voltage on the signal line bus 19 with respect to the common bus 8 will cause the transistor 25 to turn off. With the transistor 25 non-conductive, a current will flow through the resistor 29 and into the gate of the SCR 15, thereby rendering the SCR 15 conductive. With the SCR 15 conducting, the relatively low resistance path thereby effected rapidly discharges the capacitor 10. The rapid discharge of the capacitor 10 produces a trigger pulse at the flash tube triggering terminal 5 thereby initiating the light producing function of the flash tube 4. As the flash tube 4 begins to conduct, the voltage on the high voltage bus 6 is suddenly reduced as the charge on the capacitor 2 is dumped through the flash tube 4. That sudden voltage decrease on the high voltage bus 6 is coupled through the capacitor 21 to the signal line bus 19. The coupling action of the capacitor 21 causes the voltage on the signal line bus 19 to suddenly decrease to a negative value with respect to the reference voltage on the common bus 8. The negative voltage on the signal line bus 19 with respect to the voltage on the common bus 8 is coupled to the sensing means 47 through the terminals 33 and 35.

Initially, the output terminal 55 of the light sensing means 47 is positive with respect to the voltage appearing at the output terminal 53, and the diode 59 will prevent conduction in the light sensing circuit, since it is, at that time, reverse biased. However, as is now apparent, when the flash tube begins to conduct, the voltage at the output terminal 53 of the light sensing means 47 becomes positive with respect to the voltage appearing at the output terminal 55. The diode 59 will then be forward biased and allow a current to flow therethrough. The diode 57 will thereupon be reverse biased, effectively disconnecting the switching means S from the light sensing means 47. The potential which appears across the sensing means terminals 53 and 55 subsequent to a firing of the flash unit 1 is effective to cause the zener diode 68 to conduct in the reverse direction, thereby turning on the transistor 66. The current flowing through the diode 59 flows through the resistor 63 and 65 and the transistor 66 to the terminal 55. That current establishes a voltage at the anode of the LASCR 61 which effectively powers or enables the LASCR 61. That is the potential difference appearing across the LASCR 61 is, of such a magnitude to enable the LASCR 61 to become conductive upon receipt of a subsequent triggering signal at its gate. The time interval between the activation of the switching means S connecting the input terminals 49 and 51 of the light sensing means 47, and the powering of the LASCR 61, is relatively short and only a momentary contact is required from the switching means S for the proper operation of the system.

When the transistor 66 is conducting, a potential is established at the slider 67 and applied thereby to the cathode of the LASCR 61. The potential thus appearing at the cathode of the LASCR 61 is hereinafter designated as the threshold potential. When the LASCR 61 is thus enabled, a current representative of the amount of light received thereby, flows through its gate to the integrating capacitor 73 and through the anticipation resistor 75. The instantaneous voltage appearing at the capacitor 73 represents a light controlled signal. The function of the anticipation resistor 75 is fully explained in U.S. Pat. No. 3,519,879.

When the light controlled signal or voltage at the gate of the LASCR 61 exceeds the threshold signal or voltage, and an enabling signal or voltage is present across the anode to cathode path of the LASCR 61, the LASCR 61 becomes conductive. When the LASCR 61 becomes conductive, a relatively lower resistance path is presented between the signal line bus 19 and the common bus 8; the signal line potential will thereupon exhibit a step change toward the common bus reference potential. That step change appears across the base to emitter junction of the transistor 37 and is effective to turn the transistor 37 off. With the transistor 37 non-conducting, a current will flow into the gate of the SCR 17, thereby rendering the SCR 17 conductive. When the SCR 17 becomes conductive, a lower resistance path is presented to the capacitor 14 of the flash unit 1 which causes the capacitor 14 to dump its change therethrough. That action induces a triggering signal to appear at the quench tube triggering terminal 13 thereby initiating conduction in the quench tube 12.

After the quench tube 12 fires, the charge stored in the capacitor 2 of the flash unit 1 will dissipate to a point where the voltage on the high voltage bus 6 is insufficient to support ionization in either the quench tube 12 or the flash tube 4. The quench tube 12 and the flash tube 4 will therefore turn off. The charging circuit connected to the terminals 3 and 7 of the flash tube 1 will then begin to recharge the capacitor 2. The voltage appearing at the bus 6 will build up to a value sufficient to restore the biasing voltage required to turn the transistors 37 and 25 on and the system shown in FIG. 1 will be returned to its ready condition to await the initiation of another cycle.

As shown in curve A of FIG. 2, the prior art sensor (U.S. Pat. No. 3,793,556) transmitted a flash signal when the shutter switch S was engaged at a time t1. When the flash tube 4 was fired, the enable signal would be transmitted from the flash unit 1 to the sensing means. That enable signal occurs between the times t2 and t3. Subsequent to the generation of the enabling signal and after the sensing means has received a predetermined amount of light from the scene to be photographed, the quench signal would ideally be generated at a time t4, for example. In the prior art devices, that quench signal took the form of a pulse as shown in curve A of FIG. 2. With such prior art devices, the sensing means could possibly generate and transmit an erroneous quench signal during the time period between t2 and t3. The pulse-type quench signal was of limited value in systems wherein a plurality of flash units were to be simultaneously quenched inasmuch as the short pulse did not include sufficient energy to reliably trigger such a plurality of quench circuits. With the present invention, the zener diode 72 substantially comprises a blocking means and precludes the sensing means 47 from generating a quench signal until a time subsequent to the time t3. The zener diode 72 is sized to break down only after the signal line potential has reached some negative value less than that required to break down the zener diode 68. With the zener diode 68 and the transistor 66 non-conducting during the time t2 to t3, the LASCR 61 cathode is at anode potential through wiper 67 and resistor 65. This condition prevents the LASCR 61 from being fired due to noise during the time t2 to t3. At some point in time later during t2 to t3, the voltage across the buses 19 and 8 is sufficient to cause the zener diode 72 to conduct. Then the cathode of the LASCR 61 begins to move away from the anode voltage of the LASCR 61. Since the gate of the LASCR 61 is at bus 19 voltage, the cathode-gate junction of the LASCR 61 is significantly reverse biased, preventing noise from firing the LASCR. Thus, the inclusion of the zener diode 72 significantly increases the noise rejection capabilities of the LASCR 61 during the interval t2 and t3.

When the voltage across the buses 19 and 8 reaches sufficient voltage for the zener diode 68 to conduct, then the transistor 66 conducts and the cathode of the LASCR 61 moves to the reference voltage set by the wiper 67 of the resistor 65. The zener diode 72 is then non-conducting and the sensing means is then rendered operable to sense light and develop a valid quench signal. Further, with the zener diode 72, the quench signal is in the form of a step increase of the signal line potential from the enabling level to the quenching level. The readily discernable step change in the signal line potential, vis-a-vis the prior art pulse, is significantly more effective in quenching a greater number of flash units 1 and is significantly more identifiable in a noisy background.

Thus, there has been provided, in accordance with the present invention, an improved sensing means for use with an electronic flash unit in a computer-type flash system which substantially precludes the premature generation of a quench signal and provides a readily discernable quench signal with sufficient power to effect the quenching of a plurality of associated electronic flash units.

The embodiments of the invention in which an exclusive property or privilege is claimed are defined as follows:

1. For use with an electronic flash unit, a light sensor comprising first and second terminals for receiving a reference potential and a signal line potential, respectively, from the flash unit, said signal line potential exhibiting a flash-initiated enabling command change with respect to said reference potential when said flash unit is selectively rendered operative;

light responsive integrating means and switching means connected to said terminals and rendered capable by said signal line potential of being switched from a first state to a second state by a triggering effect only after said signal line potential achieves a first predetermined level during said enabling command change;

a threshold signal arrangement connected to said terminals and to said means for supplying to the latter a threshold signal derived from said signal line potential when the latter achieves a second predetermined level, which is higher than said first level, during said enabling command change;

said means being operative upon receiving a predetermined quantity of light in the presence of said threshold signal to produce a triggering effect which causes said means to switch to said second state for an appropriate time period; and a reference voltage device connected to said means and responsive to the level of said signal line potential to bias said means, and to prevent said means from experiencing any triggering effect and from switching to said second state, while said signal line potential lies between said first and second levels, and responsive to the state of said means for producing a flash quench command change in said signal line potential as long as said means is in said second state.

2. A light sensor as specified in claim 1, wherein said device is a zener diode.

3. A light sensor as specified in claim 2, wherein said means include a silicon controlled rectifier which, in the presence of said triggering effect, becomes conductive to switch said means from said first state to said second state; said rectifier has an anode connected to said first terminal, a gate connected in a light integrating circuit to said second terminal, and a cathode connected through said zener diode to said second terminal; and wherein said zener diode is poled to reverse-bias the gate-cathode junction of said rectifier when the latter is not conductive, and to raise the potential of said second terminal while said rectifier is conductive.

4. A light sensor as specified in claim 3, wherein said rectifier is a light activated silicon controlled rectifier.

* * * * *